United States Patent
Vargantwar et al.

(10) Patent No.: US 8,457,069 B1
(45) Date of Patent: Jun. 4, 2013

(54) SELECTING A WIRELESS COMMUNICATION DEVICE FOR HANDOFF BASED ON ACTIVE SET CHARACTERISTICS

(75) Inventors: Sachin R. Vargantwar, Overland Park, KS (US); Anoop K. Goyal, Overland Park, KS (US); Siddharth S. Oroskar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 367 days.

(21) Appl. No.: 12/847,198

(22) Filed: Jul. 30, 2010

(51) Int. Cl.
*H04W 4/00* (2009.01)

(52) U.S. Cl.
USPC .......................................... 370/331

(58) Field of Classification Search
USPC .......................... 370/331, 332, 333
See application file for complete search history.

(56) References Cited

U.S. PATENT DOCUMENTS

| | | | |
|---|---|---|---|
| 5,369,681 A | 11/1994 | Boudreau et al. | |
| 5,978,463 A | 11/1999 | Jurkevics et al. | |
| 6,069,871 A | 5/2000 | Sharma et al. | |
| 6,181,945 B1 | 1/2001 | Lee | |
| 6,223,042 B1 | 4/2001 | Raffel | |
| 6,243,590 B1 | 6/2001 | Reddy et al. | |
| 6,556,831 B1 | 4/2003 | Buppelmann | |
| 6,643,520 B1 | 11/2003 | Park et al. | |
| 6,745,039 B1 | 6/2004 | Di Lalla | |
| 6,922,561 B2 | 7/2005 | Chen et al. | |
| 6,963,750 B1 | 11/2005 | Cheng et al. | |
| 7,065,361 B1 | 6/2006 | Fortuna | |
| 7,177,658 B2 | 2/2007 | Willenegger et al. | |
| 7,260,415 B1 | 8/2007 | Oh | |
| 7,349,699 B1 | 3/2008 | Kelly et al. | |
| 7,366,526 B2 | 4/2008 | Zhang et al. | |
| 7,558,588 B2 * | 7/2009 | To et al. | 455/512 |
| 7,873,346 B2 * | 1/2011 | Petersson et al. | 455/406 |
| 2004/0037264 A1 | 2/2004 | Khawand | |
| 2004/0125768 A1 | 7/2004 | Yoon et al. | |
| 2004/0192306 A1 | 9/2004 | Elkarat et al. | |
| 2006/0058056 A1 | 3/2006 | Das et al. | |
| 2006/0094423 A1 | 5/2006 | Sharma et al. | |
| 2006/0116125 A1 | 6/2006 | Buckley et al. | |
| 2006/0142032 A1 | 6/2006 | Derakhshan et al. | |
| 2006/0142051 A1 | 6/2006 | Purnadi et al. | |

(Continued)

FOREIGN PATENT DOCUMENTS

EP  2 244 502  10/2010

OTHER PUBLICATIONS

Office Action for U.S. Appl. No. 12/815,700 dated Dec. 14, 2011, 9 pages.

(Continued)

*Primary Examiner* — Mark Rinehart
*Assistant Examiner* — Mohammad Anwar (57) ABSTRACT

Methods and devices for a radio access network (RAN) to select a wireless communication device (WCD) for handoff to a given sector are presented. In particular, the RAN may receive resource requests from a first WCD and a second WCD, both WCDs contending for a resource of the given sector. Based on the each WCD's active sets of sectors, the RAN may grant the resource to one of these WCDs. Preferably, the RAN grants the resource to the WCD that is more likely to benefit from use of the resource.

20 Claims, 5 Drawing Sheets

U.S. PATENT DOCUMENTS

| | | | |
|---|---|---|---|
| 2006/0160551 | A1 | 7/2006 | Matoba et al. |
| 2006/0274685 | A1 | 12/2006 | Johnson et al. |
| 2007/0053336 | A1 | 3/2007 | Petrovic et al. |
| 2007/0105535 | A1 | 5/2007 | Jacobson et al. |
| 2007/0173252 | A1 | 7/2007 | Jiang |
| 2008/0025235 | A1 | 1/2008 | Mahany et al. |
| 2008/0032713 | A1 | 2/2008 | Yang |
| 2008/0081623 | A1 | 4/2008 | Burgan et al. |
| 2008/0096520 | A1 | 4/2008 | Benco et al. |
| 2008/0293419 | A1 | 11/2008 | Somasundaram et al. |
| 2008/0293437 | A1 | 11/2008 | Ranganathan et al. |
| 2009/0016328 | A1 | 1/2009 | Peisa et al. |
| 2009/0061854 | A1 | 3/2009 | Gillot et al. |
| 2009/0247137 | A1 | 10/2009 | Awad |
| 2009/0285113 | A1 | 11/2009 | Yavuz et al. |
| 2010/0120437 | A1 | 5/2010 | Foster et al. |
| 2010/0268674 | A1 | 10/2010 | Dwyer et al. |
| 2010/0311420 | A1 | 12/2010 | Reza et al. |
| 2010/0322171 | A1* | 12/2010 | Dekorsy et al. ............... 370/329 |
| 2011/0021197 | A1 | 1/2011 | Ngai |
| 2011/0034167 | A1 | 2/2011 | Ben-Shaul et al. |

OTHER PUBLICATIONS

Vargantwar et al., U.S. Appl. No. 12/815,700, filed Jun. 15, 2010, 41 pages.

Shah et al., U.S. Appl. No. 12/553,661, filed Sep. 3, 2009, 33 pages.

Oroskar et al., U.S. Appl. No. 12/558,359, filed Sep. 11, 2009, 36 pages.

Oroskar et al., U.S. Appl. No. 12/572,829, filed Oct. 2, 2009, 40 pages.

Oroskar et al., U.S. Appl. No. 12/690,629, filed Jan. 20, 2010, 38 pages.

Oroskar et al., U.S. Appl. No. 12/756,027, filed Apr. 7, 2010, 34 pages.

Oroskar et al., U.S. Appl. No. 12/776,287, filed May 7, 2010, 36 pages.

Oroskar et al., U.S. Appl. No. 12/786,174, filed May 24, 2010, 42 pages.

Oroskar et al., U.S. Appl. No. 12/786,184, filed May 24, 2010, 42 pages.

Vondemkamp et al., U.S. Appl. No. 11/535,870, filed Sep. 27, 2006, 29 pages.

Office Action for U.S. Appl. No. 11/535,870 dated Apr. 3, 2009, 14 pages.

Final Office Action for U.S. Appl. No. 11/535,870 dated Nov. 12, 2009, 22 pages.

Advisory Action for U.S. Appl. No. 11/535,870 dated Feb. 18, 2010, 14 pages.

Office Action for U.S. Appl. No. 12/853,730 dated Jan. 18, 2012, 13 pages.

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.

Office Action for U.S. Appl. No. 12/815,709 dated Feb. 21, 2012, 5 pages.

Cai, L. et al., "Mitigating DoS Attacks on the Paging Channel by Efficient Encoding in Page Messages," In: Proceedings of 5th International ICST Conference on Security and Privacy in Communication Networks (SecureComm 2009) Sep. 2009, 20 pages.

TIA Standard, "Interoperability Test Specification for cdma2000® Air Interface," TIA-1036, Section 3.11, Jan. 2005, 4 pages.

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.

Vargantwar et al., U.S. Appl. No. 12/815,709 dated Jun. 15, 2010, 42 pages.

Bhan et al., U.S. Appl. No. 12/261,229 dated Oct. 30, 2008, 55 pages.

Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).

NTT DoCoMo et al., "IDLE Mode Mobility Control Principles," 3GPP TSG RAN WG2 #59BIS; 3GPP Draft; R2-074001, 8 pages, Oct. 8-12, 2007.

NTT DoCoMo et al., "Load Balancing Solutions for LTE," 3GPP TSG RAN WG2 #58bis; 3GPP Draft; R2-072719, 5 pages, Jun. 22, 2007.

International Search Report and Written Report for PCT/US2012/028070 mailed May 7, 2012, 15 pages.

Office Action for U.S. Appl. No. 13/044,794 mailed Jul. 18, 2012, 22 pages.

\* cited by examiner

SELECTING A WIRELESS COMMUNICATION DEVICE FOR HANDOFF BASED ON ACTIVE SET CHARACTERISTICS

BACKGROUND

Wireless service providers typically design their wireless networks to comprise a number of partially-overlapping wireless coverage areas. Each wireless coverage area may include multiple sectors. As a wireless communication device (WCD) that is subscribed to the wireless service provider moves about, these wireless networks may hand off the WCD from one sector to another. A goal of performing handoffs is to provide a substantially continuous wireless coverage to the WCD, so that any communication sessions conducted by the WCD are not dropped or degraded due to poor wireless coverage or loss of wireless coverage.

In order to facilitate smooth handoffs, the WCD may simultaneously receive multiple copies of the same bearer data (e.g., voice or data) from more than one sector. The sectors from which the WCD receives this bearer data make up the WCD's active set, and the sectors in the active set may vary as the WCD moves about and/or the quality of the signals the WCD receives from these sectors changes. In general, the more sectors in a WCD's active set and the greater the strength of signals the WCD receives from these sectors, the better the WCD's wireless coverage. Thus, careful management of a WCD's active set may allow a wireless service provider to offer a superior wireless coverage to the WCD.

OVERVIEW

According to the embodiments herein, a radio access network (RAN) may be able to efficiently allocate the resources of busy sectors to WCDs that are likely to benefit from use these sectors. In particular, the RAN may determine that a given sector could be added to the active sets of two WCDs, but that the given sector lacks the resources to serve both WCDs simultaneously. Then, in response to this determination, the RAN may examine the active set of each WCD in order to establish which WCD is more likely to benefit from use of the given sector, so that the RAN can allocate the resources to that WCD.

Accordingly, in a first embodiment, the RAN may receive a first resource request from a first WCD. Preferably, the first WCD has a first active set of sectors. Also, the RAN may receive a second resource request from a second WCD. Preferably, the second WCD has a second active set of sectors. In response to receiving the first resource request and the second resource request, the RAN may determine that the first WCD and second WCD are contending for a resource of a given sector defined by the RAN. Then, in response to determining that the first WCD and second WCD are contending for the resource, the RAN may compare the first active set to the second active set. Based on a result of the comparison, the RAN may allocate the resource to one of the two WCDs.

This comparison may take various forms. For instance, the RAN may compare the size of the first active set to the size of the second active set. If the first active set is smaller than the second active set, the RAN may allocate the resource to the first WCD. However, if the second active set is smaller than the first active set, the RAN may allocate the resource to the second WCD. In this way, the RAN may allocate the resource to the WCD that is more likely to benefit from having the additional wireless coverage afforded by the given sector.

Alternatively or additionally, the first active set and the second active set may be compared in different ways. For example, the first WCD may determine signal strength measurements from each sector in the first active set, and the second WCD may determine signal strength measurements from each sector in the second active set. Each WCD may transmit their respective signal strength measurements to the RAN. Then, the RAN may use these respective signal strength measurements, or some calculation applied to such measurements, to determine which WCD is more likely to benefit from use of the given sector.

Thus, in second embodiment, the RAN may receive a first resource request from a first WCD. Preferably, the first WCD has a first active set of sectors, such that the signal strengths that the first WCD receives from sectors in the first active set cooperatively define a first active set measurement. Likewise, the RAN may also receive a second resource request from a second WCD. Preferably, the second WCD has a second active set of sectors, such that the signal strengths the second WCD receives from sectors in the second active set cooperatively define a second active set measurement. An active set measurement may be defined by one or more operations that can be performed on measured signal strengths from the sectors in the active set. These operations could be, for example, a minimum, a maximum, a median, a mean, or some other type of operation, and could be performed by a WCD or the RAN.

In response to receiving the first resource request and the second resource request, the RAN may determine that the first WCD and second WCD are contending for a resource of a given sector. The RAN may also determine that the first WCD receives signals from the given sector at a first signal strength and that the second WCD receives signals from the given sector at a second signal strength. In response to making these determinations, the RAN may compare the first signal strength with the first active set measurement to produce a first result. Preferably, the first result approximates the benefit that the first WCD would receive from use of the given sector. The RAN may also compare the second signal strength with the second active set measurement to produce a second result. Preferably, the second result approximates the benefit that the second WCD would receive from use of the given sector. Then, the RAN may compare the first result with the second result to produce a third result. Performing this comparison may provide the RAN with an indication of which WCD is more likely to benefit from use of the given sector. Based on the third result, the RAN may allocate the resource to one of the WCDs.

For either of the first or second embodiments, once the RAN chooses which WCD to allocate the resource, the RAN may transmit a message to that WCD. Preferably this message indicates that the chosen WCD may add the given sector to its active set. In response, the chosen WCD may add the given sector to its active set and begin receiving bearer data via the given sector.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
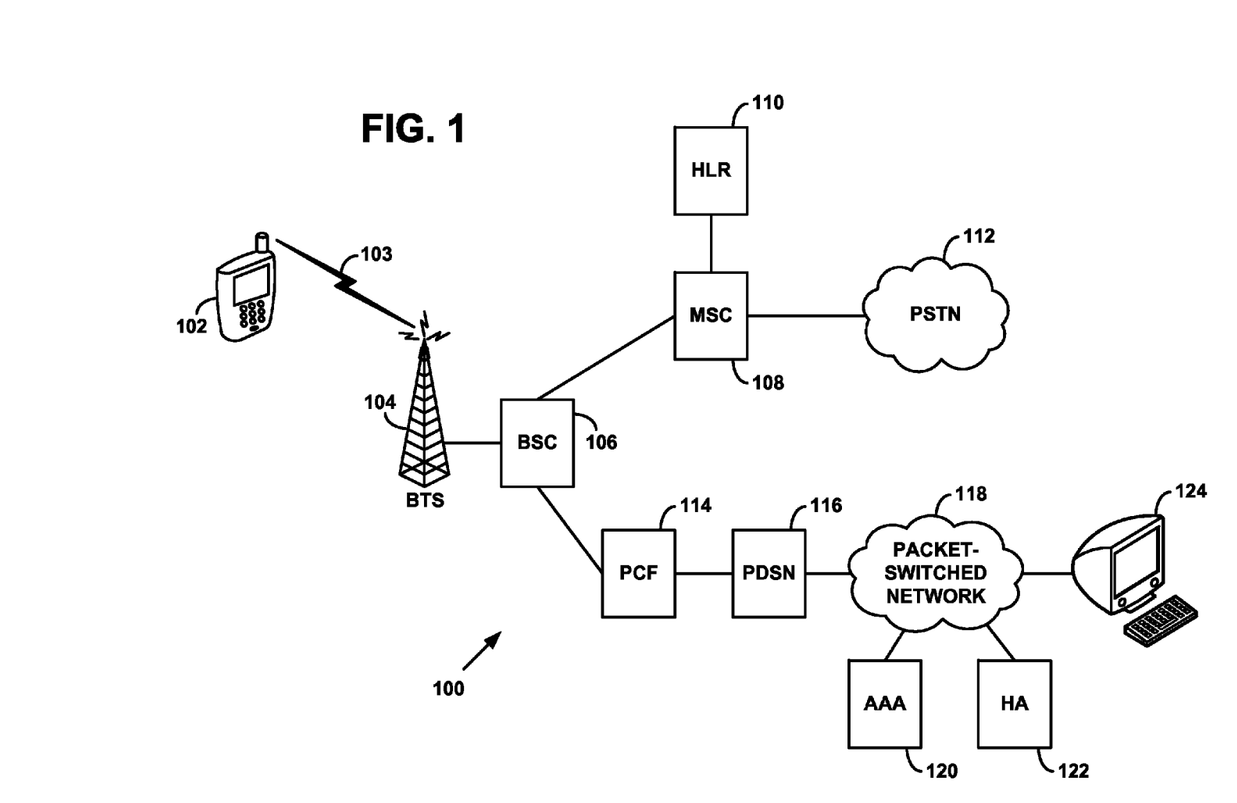
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

Figure 2:
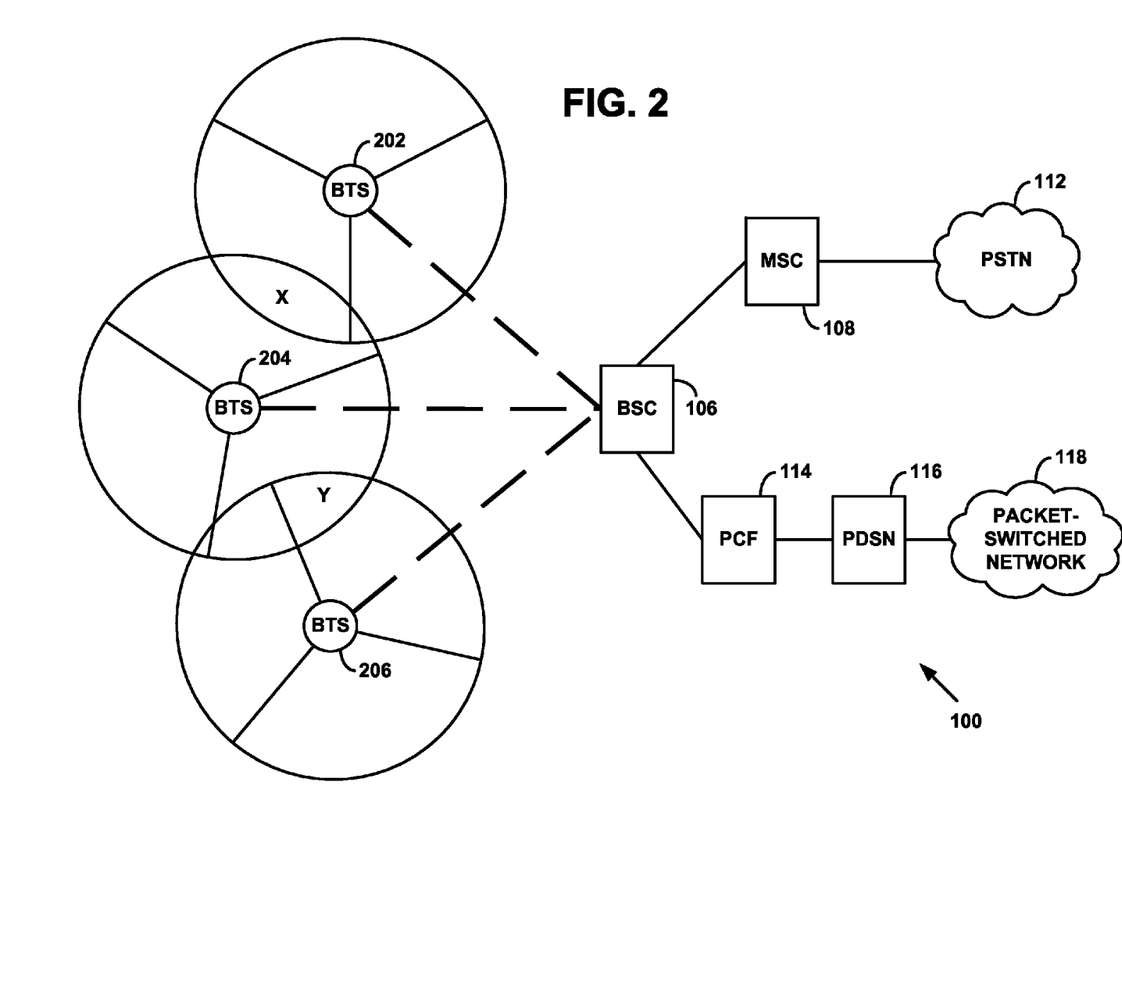
FIG. 2 depicts a RAN radiating to define several wireless coverage areas, in accordance with an example embodiment.

In practice, a BSC may serve multiple BTSs, each of which may then radiate to define a wireless coverage area. Each wireless coverage area, in turn, may comprise a plurality of sectors. This arrangement is illustrated in FIG. 2, which shows BSC 106 in network 100 coupled with BTSs 202, 204, and 206. Each BTS is shown at the core of a respective circle representing a wireless coverage area, and each wireless coverage area is divided into three pie-shaped pieces representing sectors. With this arrangement, a WCD may operate in any of the sectors and can connect, via a serving BTS, with MSC 108 for circuit-based services and/or via PCF 114 and PDSN 116 for packet-based services. Note that the depiction of three sectors for each of the BTSs in FIG. 2 is intended to be for purposes of example, and other numbers of sectors per BTS are possible. Further, the relative positions of the BTSs and the relative angular orientations of the sectors are also illustrative, and other arrangements may be used. Moreover, wireless coverage area need not be circular, and may take on other shapes and arrangements instead.

As discussed previously, a WCD may receive the same bearer data simultaneously from more than one sector. To illustrate that point, FIG. 2 includes points X and Y. While in the vicinity of point X, a WCD may be able to receive signals from sectors of BTS 202 and BTS 204. Similarly, while in the vicinity of point Y, a WCD may be able to receive signals from sectors of BTS 204 and BTS 206. It should be noted that, in practice, a WCD located at or near points X or Y may be able to receive signals (and therefore simultaneously receive the same bearer data) from more than two sectors.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
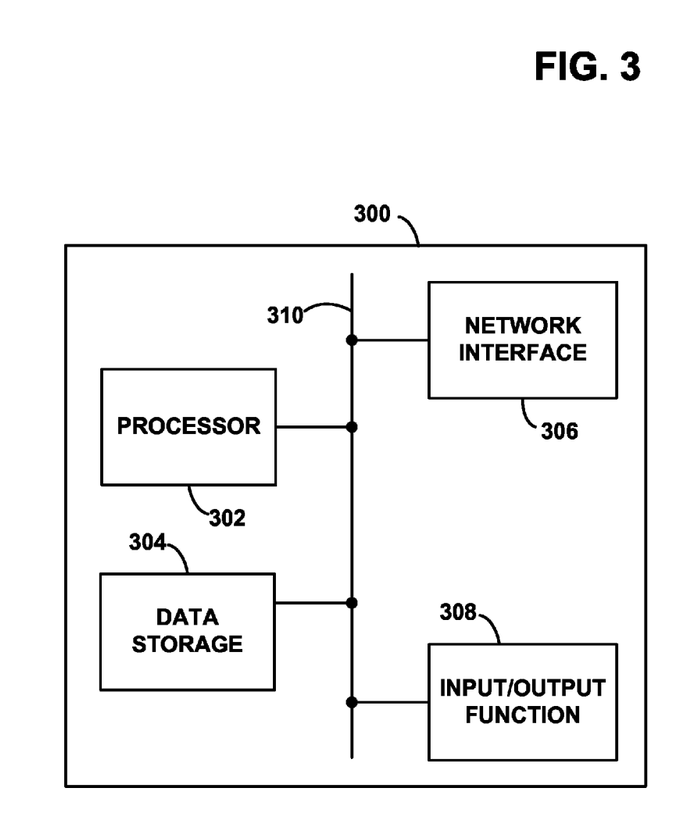
FIG. 3 is a block diagram of a RAN component, in accordance with an example embodiment.

FIG. 3 is a simplified block diagram exemplifying a RAN component 300, illustrating some of the functional components that would likely be found in a RAN component arranged to operate in accordance with the embodiments herein. Example RAN component 300 could be any type of device found in or associated with a RAN, such as a BTS, a BSC, or an MSC. For purposes of simplicity, this specification may equate RAN component 300 to a BSC from time to time. Nonetheless, it should be understood that the description of RAN component 300 could apply to any component used for the purposes described herein.

Example RAN component 300 preferably includes a processor 302, a data storage 304, a network interface 306, and an input/output function 308, all of which may be coupled by a system bus 310 or a similar mechanism. Processor 302 preferably includes one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 preferably holds program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or USB port.

II. CDMA Communications

The present invention will be described by way of example with reference to Code Division Multiple Access (CDMA) communications in general. However, it should be understood that the invention can apply to other families of protocols now known or developed in the future.

In a CDMA wireless network, each wireless coverage area may employ one or more carrier frequencies, typically 1.25 MHz in bandwidth each, and each sector may be distinguished from adjacent sectors by a pseudo-random number offset ("PN offset"). Further, each sector may concurrently communicate on multiple channels that are distinguished from one another by different CDMA codes (i.e., different Walsh codes). When a WCD operates in a given sector, communications between the WCD and the BTS of the sector may be carried on a given frequency and may also be encoded by the sector's PN offset and a given Walsh code.

Air interface communications in a wireless coverage area may be divided into forward link communications and reverse link communications. On the forward link, certain Walsh codes may be reserved for use to define control channels, including a pilot channel, a sync channel, and one or more paging channels, and the remainder can be assigned dynamically for use as traffic channels, i.e., to carry user communications such as email web browsing, voice, video, and so on. Similarly, on the reverse link, one or more Walsh codes may be reserved for use to define access channel(s), and the remainder may be assigned dynamically for use as traffic channels.

A WCD may communicate with a number of "active" sectors at a time. Depending on the type and/or configuration of the RAN, the number of active sectors may be from one to six. However, more than six active sectors may be used without departing from the scope of this invention. The WCD may maintain a list of the active sectors, identified according to their PN offsets. This list may be referred to as the WCD's "active set."

A RAN may be arranged to transmit the same bearer data to a given WCD concurrently via some or all of the sectors in the given WCD's active set, encoding each transmission according to the PN offset of the respective sector and the Walsh code for the assigned channel therein. Correspondingly, the WCD may decode forward link transmissions from each sector using the respective sector's PN offset together with the WCD's respectively allocated Walsh code for the sector. The concurrent transmissions in sectors of the active set provides an added level of reliability to communications, as well as possibly increased quality owing to improved signal-to-noise characteristics. The concurrency also facilitates a form of seamless handoff between sectors, referred to as "soft handoff" when the handoff is between sectors of different BTSs, and "softer handoff" when the handoff is between sectors of the same BTS. (For sake of simplicity, only the term "soft handoff" will be used in the following discussion.)

In addition to its active set, the WCD may maintain a list of "candidate" sectors (typically up to six, but more is possible), which includes sectors that are not in the WCD's active set but that have sufficient signal strength such that the WCD could demodulate signals from those sectors. Further, the WCD may maintain a list of "neighbor" sectors that are not in its active set or candidate set, but in close vicinity to the WCD and deemed by the RAN to be sectors that the WCD should monitor for eligibility as candidate sectors. Other sectors that are not in the WCD's active set, candidate set, or neighbor set may be members of a "remaining" set.

To facilitate a determination of which sectors should be in the WCD's active and candidate sets, each BTS may emit a pilot channel signal per each sector the respective BTS defines. The WCD may constantly, or from time to time, measure the strength of each pilot channel signal that it receives and may notify the RAN when a received pilot strength is above or below designated thresholds.

More particularly, the BTS may provide the WCD with a handoff direction message (HDM), which indicates (i) the PN offsets of the sectors in the WCD's active set, and (ii) the following handoff parameters that relate to pilot signal strength:

T_ADD: Threshold pilot strength for addition to the active set (e.g., −14 decibels)
T_COMP: Difference in signal strength from an active set pilot (e.g., 2 decibels)
T_DROP: Threshold pilot strength for removal from the active set (e.g., −16 decibels)
T_TDROP: Time for which an active set pilot falls below T_DROP to justify removal from the active set (e.g., 2 seconds)

Additionally, the BTS may provide the WCD with a Neighbor List Update Message (NLUM), which identifies the WCD's "neighbor" sectors.

The WCD may then monitor the pilot signals that it receives, measuring signal strength for each as $E_c/I_o$, where $E_c$ is energy per CDMA chip for the pilot signal of a given sector and $I_o$ is the total power received. Values of $E_c/I_o$ may range from 0 (very good signal strength) to −16 (very poor signal strength). It should be understood that $E_c/I_o$ measures a signal-to-noise ratio, but other methods of measuring signal strength, as well as other ranges of signal strength values, may be used.

If the pilot signal strength of any neighbor sector exceeds T_ADD, the WCD may add the pilot to its "candidate" set, and transmit a pilot strength measurement message (PSMM) to the BSC with information indicative of the identity of the sector. If the pilot strength exceeds any active sector signal by T_COMP, and the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new sector to its active set may be referred to as a soft handoff.

If the WCD detects that the signal strength of a pilot in its active set drops below T_DROP, the WCD starts a handoff drop timer. If T_TDROP passes without this signal strength exceeding T_DROP, the WCD then transmits a PSMM to the BSC, indicating the sector and the detected $E_c/I_o$. The BSC may then respond by transmitting an HDM to the WCD, without the sector in the active set. The WCD may then receive the HDM and responsively move the sector to its neighbor set and transmit an HCM to the BSC.

In this way, while the WCD is actively communicating (e.g., transmitting and/or receiving bearer data), the WCD may be receiving such communications from more than one sector. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly and the more likely it is that the WCD will successfully be handed off to new sectors.

Typically, a RAN will serve soft handoff requests in a first-come-first-served fashion, which may lead to the RAN allocating resources to WCDs inefficiently. For example, suppose that WCD 1 has an active set of two sectors, from which WCD 1 receives signals with strengths of −14 decibels and −16 decibels, respectively. Suppose further that WCD 2 has an active set of three sectors, from which WCD 2 receives signals with strengths of −6 decibels, −10 decibels and −12 decibels, respectively. Thus, WCD 1 has a smaller active set than WCD 2, and WCD 1 receives signals from the sectors in its active set at a strength of −14 decibels or less, while WCD 2 receive signals from the sectors in its active set at a strength of −12 decibels or more. If both WCD 1 and WCD 2 receive signals from a given sector at a strength of −7 decibels, then clearly WCD 1 is more likely to benefit from use of the given sector than WCD 2. However, RANs that follow the first-come-first-served sector assignment procedure may assign the given sector to WCD 2 rather than WCD 1. As a result, WCD 1 may suffer from poor signal quality and/or dropped calls if WCD 2 requests a resource from the RAN before WCD 1.

III. Selecting a WCD for Handoff based on Active Set Characteristics

Given that it may be advantageous for a RAN to allocate sectors to active sets using something other than a pure first-come-first-served mechanism, the RAN may consider various factors when making sector allocations. Particularly, the RAN may consider the content of each active set, and the strengths at which each WCD receives signals from the sectors the respective WCD's active set. The RAN may, for example, use this information in an attempt to allocate the Walsh codes to WCDs that are more likely to benefit from use of the sector(s). It should be understood that, to do so, the RAN may buffer, or temporarily store, some number of resource requests from WCDs before performing sector allocations in response to these request. For example, the RAN may perform sector allocations every 10 milliseconds on resource requests that have arrived in the 10 millisecond window since the previous sector allocations were performed.

As discussed above, a given WCD keeps track of sectors in its active set, candidate set, neighbor set, and remaining set. The given WCD may also keep track of recent signal strength measurements (e.g., $E_c/I_o$ measurements) from at least some of these sectors (in particular, the sectors in the given WCD's active set and candidate set). However, the RAN may not keep track of these sectors or the respective strengths at which the given WCD receives signals from these sectors.

Therefore, in order to update the RAN with recent signal strength measurements from sectors in the given WCD's active set, the given WCD may include this information in PSMMs that the given WCD transmits to the RAN. For instance, in each PSMM, the given WCD may include a list of PN offset and signal strength pairs, each of these pairs corresponding to a particular sector in the given WCD's active set.

Alternatively, the given WCD may include this list in only some PSMM messages, or may include the list in different types of messages that the given WCD transmits to the RAN. Further, the list may include PN offset and signal strength pairs corresponding to sectors in the given WCD's candidate set, neighbor set, and remaining set as well. From the content of this list, the RAN may determine the WCD's active set measurement. Alternatively, the WCD may determine its active set measurement and transmit this active set measurement to the RAN in a PSMM or some other message.

a. Example Flow Charts

Figure 4:
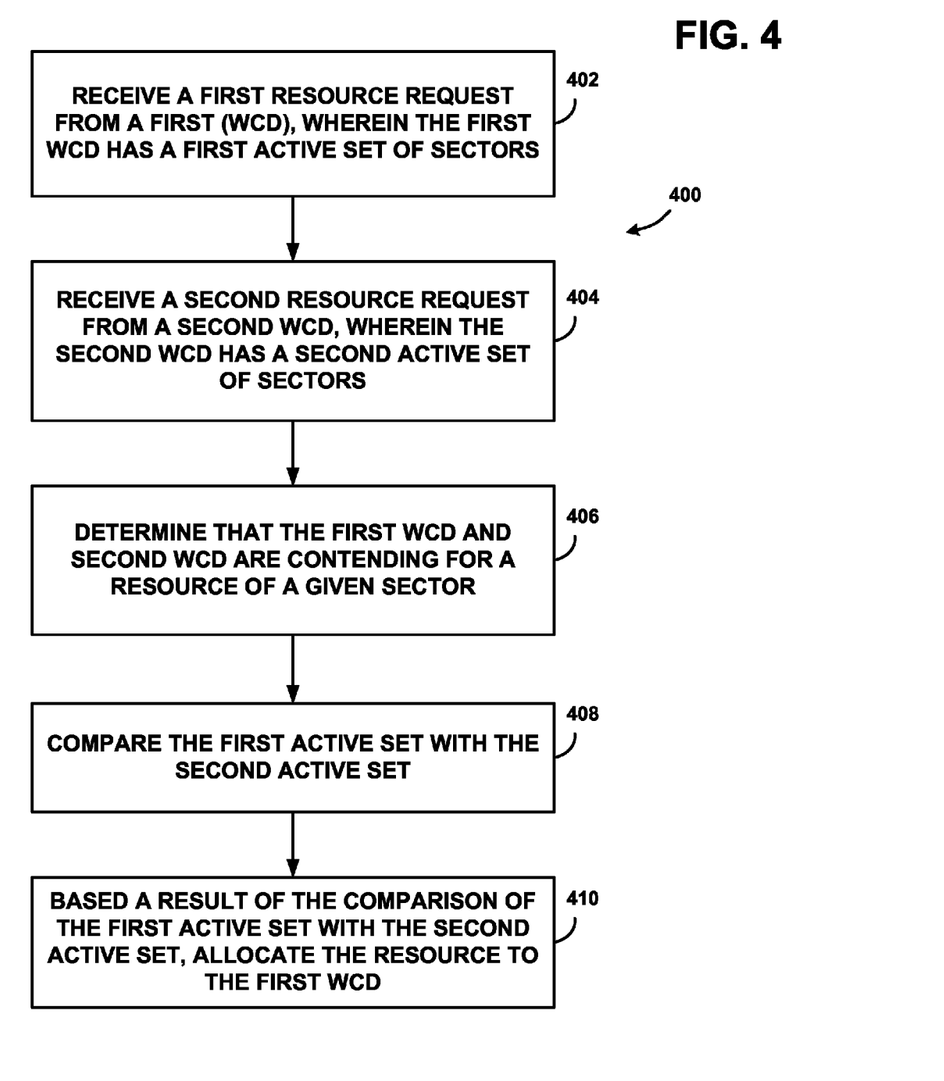
FIG. 4 is a first flow chart, in accordance with an example embodiment.

Flow chart 400 of FIG. 4 illustrates an example embodiment through which a RAN may allocate resources to WCDs in a non-first-come-first-served fashion. Although flow chart 400 involves two WCDs contending for a single resource (e.g., Walsh code), the process illustrated in flow chart 400 can be applied to scenarios in which m WCDs are contending for n resources, where m>n.

At step 402, a RAN may receive a first resource request from a first WCD, wherein the first WCD has a first active set of sectors. The first resource request may be a PSMM indicating that the first WCD is receiving a pilot signal from a given sector at a strength exceeding that of at least one sector in the first active set by T_COMP. Preferably, the given sector is defined by or under control of the RAN.

Similar to step 402, at step 404, the RAN may receive a second resource request from a second WCD, wherein the second WCD has a second active set of sectors. The second resource request may also be a PSMM, and may indicate that the second WCD is receiving the pilot signal from the given sector at a strength exceeding that of at least one sector in the second active set by T_COMP.

At step 406, which may occur in response to receiving the first resource request and the second resource request, the RAN may determine that the first WCD and second WCD are contending for a resource of the given sector. This resource may be, for example, a Walsh code, or any other type of resource that a RAN allocates to WCDs. In determining that the WCDs are contending for the resource, the RAN may establish that the resource is the only remaining resource of its type available in the given sector. Therefore the RAN may be limited to allocating the resource to only one of the WCDs.

At step 408, which may occur in response to determining that the first WCD and second WCD are contending for the resource, the RAN may compare the first active set to the second active set, and at step 410, based on at least a result of the comparison, the RAN may allocate the resource to one of the WCDs. In this case, the RAN allocates the resource to the first WCD. Accordingly, after step 410, the RAN may transmit an HDM to the first WCD indicating that the given sector has been added to the first active set, and the first WCD may begin receiving bearer data via the given sector.

When comparing the first active set to the second active set, the RAN may compare any type of information that is associated with these active sets. For instance, the RAN may compare the size of the first active set to the size of the second active set, and allocate the resource to the WCD with the smaller active set. (The size of an active set may be determined by counting the number of sectors in the active set.) In this way, the RAN allocates the resource to the WCD that is most likely to benefit from an increase in active set size.

Figure 5:
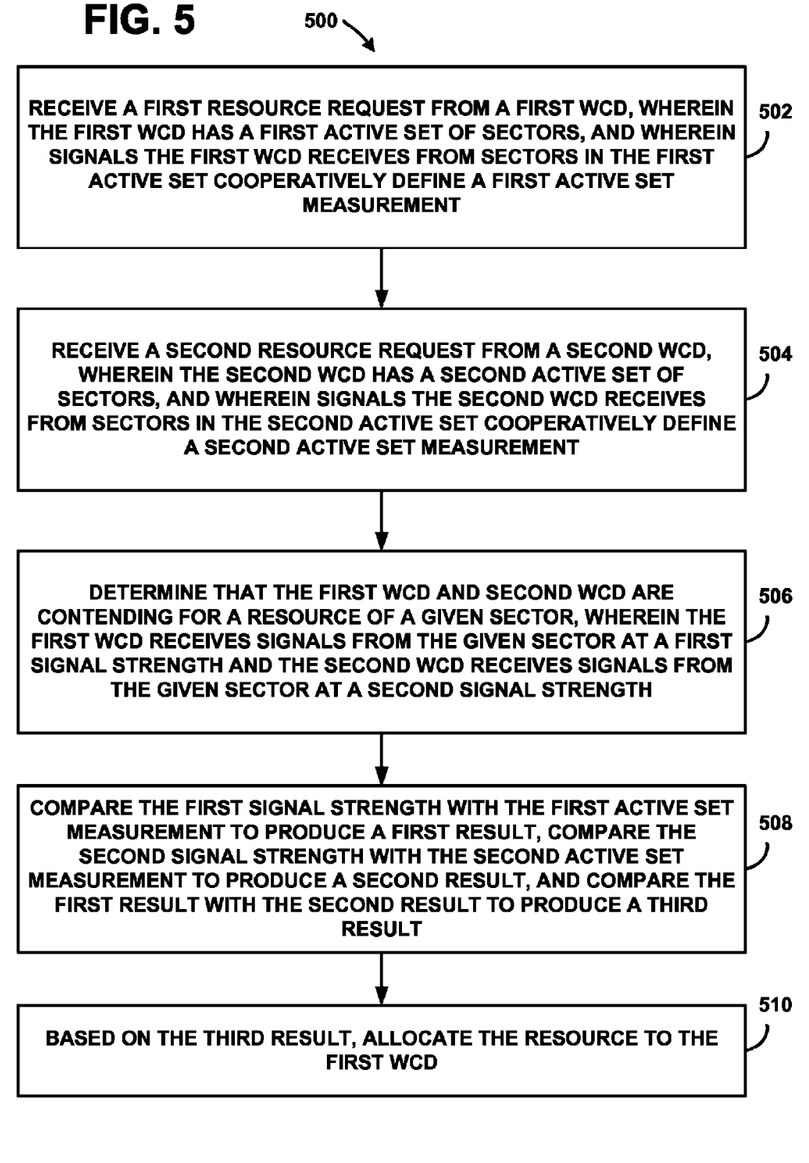
FIG. 5 is a second flow chart, in accordance with an example embodiment.

Another example embodiment is illustrated in flow chart 500 of FIG. 5. Like that of flow chart 400, the process illustrated in flow chart 500 can be applied to scenarios in which m WCDs are contending for n resources, where m>n.

At step 502, a RAN may receive a first resource request from a first WCD, wherein the first WCD has a first active set of sectors. The first resource request may be a PSMM indicating that the first WCD is receiving a pilot signal from a given sector at a strength that exceeds that of at least one sector in the first active set by T_COMP. The signals that the first WCD receives from sectors in the first active set may cooperatively define a first active set measurement. This measurement may be the result of any type of operation or operations over the signal strength values of at least some sectors in the first active set, and will be described in more detail below. Further, the first WCD may receive signals from the given sector at a first signal strength.

Similar to step 502, at step 504, the RAN may receive a second resource request from a second WCD, wherein the second WCD has a second active set of sectors. The second resource request may also be a PSMM, and may indicate that the second WCD is receiving the pilot signal from the given sector at a pilot strength that exceeds that of at least one sector in the second active set by T_COMP. Like the first active set measurement, the signals that the second WCD receives from sectors in the second active set may cooperatively define a second active set measurement. This measurement is preferably the result of by the same type of operation or operations used to perform the first active set measurement. Also, the second WCD may receive signals from the given sector at a second signal strength.

At step 506, which may be in response to receiving the first resource request and the second resource request, the RAN may determine that the first WCD and second WCD are contending for a resource of a given sector defined by or under control of the RAN. As was the case for the process illustrated by flow chart 400, this resource may be, for example, a Walsh code, or any other type or resource that a RAN allocates to WCDs, and the resource may be the only remaining resource of its type available in the given sector.

In order to determine which of the first WCD and the second WCD is more likely to benefit from being allocated the resource, at step 508, the RAN may compare the first signal strength with the first active set measurement to produce a first result, and compare the second signal strength with the second active set measurement to produce a second result. These comparisons serve to evaluate the strengths at which the first and second WCDs would receive signals from the given sector versus the strengths at which the first and second WCDs currently receive signals from sectors in their respective active sets. Thus, the first result and may be a measure of how much the first WCD might benefit from the addition of the given sector to the first active set. Likewise, the second result and may be a measure of how much the second WCD might benefit from the addition of the given sector to the second active set.

Then, the RAN may compare the first result with the second result to produce a third result, and at step 510, may allocate the resource to one of the WCDs based on the third result. For example, the third result may lead the RAN to conclude that the first WCD would benefit from the addition of the given sector to the first active set more than the second WCD would benefit from the addition of the given sector to the second active set. Accordingly, after step 510, the RAN may transmit an HDM to the first WCD indicating that the given sector has been added to the first active set, and the first WCD may begin receiving bearer data via the given sector.

It should be understood that flow charts 400 and 500 are non-limiting embodiments. Thus, more or fewer steps than shown in FIGS. 4 and 5 may be used without departing from the scope of the invention. Additionally, each and any of these steps may be repeated one or more times, or may be omitted altogether. Moreover, these steps may occur in a different order than shown in FIGS. 4 and 5. Further, flow charts 400 and 500 may be combined with one another, in whole or in part, also without departing from the scope of the invention.

To the latter point, the comparison of the first active set to the second active set at step 408 of FIG. 4 may be combined, to some extent, with step 508 of FIG. 5. For example, step 408 may involve the RAN determining that the first active set and the second active set are the same size. Then, the RAN may (i) compare the first signal strength with the first active set measurement to produce a first result, (ii) compare the second signal strength with the second active set measurement to produce a second result, and (iii) compare the first result with the second result to determine which WCD to allocate the resource.

b. Evaluation of Active Set Characteristics

The process illustrated by flow chart 500 may involve the definition of active set measurements that are based on signals a WCD receives from sectors in the WCD's active set. Then, these active set measurements may be compared to the strength of a signal that the WCD receives from a given sector, in order to determine whether the given sector should be added to the WCD's active set. The following discussion further illustrates embodiments of these active set measurements by way of example.

TABLE 1

Active set measurements.

| | WCD 1 signal strength (db) | WCD 2 signal strength (db) |
|---|---|---|
| Sector A | −14 | N/A |
| Sector B | −16 | −14 |
| Sector C | −10 | −12 |
| Sector D | N/A | −7 |
| Target Sector | −6 | −7 |
| Difference(minimum, target) | 10 | 7 |
| Difference(maximum, target) | 4 | 0 |
| Difference(median, target) | 8 | 5 |
| Difference(mean, target) | 7.97 | 4.85 |

Table 1 provides example active set measurements for two WCDs, WCD 1 and WCD2. WCD 1 has an active set consisting of sectors A, B, and C, while WCD 2 has an active set consisting of sectors B, C, and D. For each sector in these active sets, Table 1 specifies an $E_c/I_o$ value in decibels. Thus, for example, WCD 1 receives pilot signals from sector B at a strength of −16 decibels, while WCD 2 receives pilot signals from sector B at a strength of −14 decibels. It should be appreciated that decibels are measured on a logarithmic scale. Therefore, a signal strength of −16 decibels may be significantly weaker than a signal strength of −14 decibels.

WCD 1 and WCD 2 may also receive pilot signals from a target sector at strengths of −6 decibels and −7 decibels, respectively. Preferably, the RAN may be able to hand off either WCD 1 or WCD 2, but not both, to the target sector (e.g., the target sector may have exactly one unallocated Walsh code). Therefore, the RAN may seek to hand off the WCD (i.e., assign the target sector's unallocated Walsh code to the WCD) that is more likely to benefit from use of the target sector.

In order to determine whether WCD 1 or WCD 2 would be more likely to benefit from such a handoff, the RAN may perform one or more operations on the $E_c/I_o$ values for sectors in each WCD's active set. These operations may include, for example, a minimum operation, a maximum operation, a median operation, and/or a mean operation.

Table 1 provides examples of applying these operations to the $E_c/I_o$ values of the sectors in each WCD's active set. For WCD 1, the RAN may apply the "minimum" operation to the $E_c/I_o$ values of signals received by WCD 1 from sectors A, B, and C. The result of this operation is −16 decibels. Then, the RAN may calculate the difference between this result and the $E_c/I_o$ value of signals received by WCD 1 from the target sector (−6 decibels), to produce an outcome of 10 decibels. Similarly, for WCD 2, the RAN may apply the minimum operation to the $E_c/I_o$ values of signals received by WCD 2 from sectors B, C, and D. The result of this operation is −14 decibels. Then, the RAN may calculate the difference between this result and the $E_c/I_o$ value of signals received by WCD 2 from the target sector (−7 decibels), to produce an outcome of 7 decibels. Thus, according to the application of this operation, the RAN may conclude that WCD 1 may be more likely to benefit from use of the target sector than WCD 2.

Using a similar series of steps, the RAN may apply the "maximum" operation to the $E_c/I_o$ values of signals received by WCD 1 from sectors A, B, and C, and then calculate the difference between this result (−10 decibels) and the $E_c/I_o$ value of signals received by WCD 1 from the target sector (−6 decibels), to produce an outcome of 4 decibels. The RAN may also apply the maximum operation to the $E_c/I_o$ values of signals received by WCD 2 from sectors B, C, and D, and then calculate the difference between this result (−7 decibels) and the $E_c/I_o$ value of signals received by WCD 2 from the target sector (−7 decibels), to produce an outcome of 0 decibels. According to the application of this operation, the RAN may also conclude that WCD 1 may be more likely to benefit from use of the target sector than WCD 2.

The RAN may apply the "median" operation in substantially the same way as the minimum and maximum operations can be applied, resulting in an outcome of 8 decibels for WCD 1 and 5 decibels for WCD 2. According to the application of this operation, the RAN may once again conclude that WCD 1 may be more likely to benefit from use of the target sector than WCD 2.

The RAN may also apply the "mean" operation in a similar fashion. However, since $E_c/I_o$ values are logarithmic, the RAN may apply a modified mean in order to more accurately represent the central tendency of the one or more $E_c/I_o$ values. One way of calculating such a modified mean over an example set of n such values, $m_1 \ldots m_n$, is according to the equation:

$$M = 10\log_{10}\sum_{i=1}^{n} 10^{\frac{m_i}{10}}.$$

This modified mean converts the $E_c/I_o$ values to non-decibel values, calculates the arithmetic mean of these non-decibel values, and then re-converts the result into an $E_c/I_o$ value. However, other types of mean operations, such as arithmetic means and geometric means, may be used instead of this modified mean. Further, a mean, or average, calculated over $E_c/I_o$ values may be referred to as a composite $E_c/I_o$ value, or by some other terminology.

In Table 1, applying the modified mean results in an outcome of 7.97 for WCD 1 and 4.85 for WCD 2. According to the application of this operation, the RAN may once more conclude that WCD 1 may be more likely to benefit from use of the target sector than WCD 2.

Despite only four operations being shown in Table 1 and presented in the previous discussion, it should be understood that the RAN may apply any type of operation to one or more of the $E_c/I_o$ values of a WCD's active set. Thus, the present invention is not limited to the use of the minimum, maximum, median, and mean operations discussed herein. Also, the signal strength measurements may take forms other than $E_c/I_o$ values.

Further, Table 1 also shows results of a difference being calculated between the outcome of each operation and an $E_c/I_o$ value for the target sector. However, instead of or in addition to a difference, other calculations may be used. For instance, the RAN may calculate the ratio of the outcome of each operation to an $E_c/I_o$ value for the target sector, and then compare these ratios for WCD 1 and WCD 2. Where the ratio for WCD 1 is greater than the ratio for WCD 2, the RAN may conclude that WCD 1 may be more likely to benefit from use of the target sector than WCD 2. Likewise, where the ratio for WCD 2 is greater than the ratio for WCD 1, the RAN may conclude that WCD 2 may be more likely to benefit from use of the target sector than WCD 1.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method, performed by a radio access network (RAN), the method comprising:
   the RAN receiving a first resource request from a first wireless communication device (WCD), wherein the first WCD has a first active set of sectors;
   the RAN receiving a second resource request from a second WCD, wherein the second WCD has a second active set of sectors;
   in response to receiving the first resource request and the second resource request, the RAN determining that the first WCD and second WCD are contending for a resource of a given sector defined by the RAN;
   in response to determining that the first WCD and second WCD are contending for the resource, the RAN comparing the first active set with the second active set; and
   based on a result of the comparison of the first active set with the second active set, the RAN allocating the resource to the first WCD.

2. The method of claim 1, wherein comparing the first active set with the second active set comprises comparing a size of the first active set with a size of the second active set.

3. The method of claim 2, wherein the result of the comparison of the first active set with the second active set is that the size of the first active set is smaller than the size of the second active set.

4. The method of claim 2, wherein the first WCD receives signals from the given sector at a first signal strength, wherein the second WCD receives signals from the given sector at a second signal strength, wherein signals the first WCD receives from sectors in the first active set cooperatively define a first active set measurement, and wherein signals the second WCD receives from sectors in the second active set cooperatively define a second active set measurement, and wherein comparing the first active set to the second active set comprises:
   the RAN determining that the first active set and the second active set are the same size; and in response to determining that the first active set and the second active set are the same size, the RAN (i) comparing the first signal strength with the first active set measurement to produce a first result, (ii) comparing the second signal strength with the second active set measurement to produce a second result, and (iii) comparing the first result with the second result to produce the result of the comparison of the first active set with the second active set.

5. The method of claim 4, wherein the first result is a first difference between the first signal strength and the first active set measurement, wherein the second result is a second difference between the second signal strength and the second active set measurement, and wherein the result of the comparison of the first active set with the second active set is that the first difference is greater than the second difference.

6. The method of claim 4, wherein the first result is a first ratio between the first signal strength and the first active set measurement, wherein the second result is a second ratio between the second signal strength and the second active set measurement, and wherein the result of the comparison of the first active set with the second active set is that the first ratio is greater than the second ratio.

7. The method of claim 2, wherein comparing the size of the first active set with the size of the second active set comprises comparing a count of sectors in the first active set with a count of sectors in the second active set.

8. The method of claim 1, wherein the resource comprises a code division multiple access (CDMA) code.

9. The method of claim 1, wherein the resource is the only resource of a given type available in the given sector.

10. A method, performed by a radio access network (RAN), the method comprising:
   the RAN receiving a first resource request from a first wireless communication device (WCD), wherein the first WCD has a first active set of sectors, and wherein signals the first WCD receives from sectors in the first active set cooperatively define a first active set measurement;
   the RAN receiving a second resource request from a second WCD, wherein the second WCD has a second active set of sectors, and wherein signals the second WCD receives from sectors in the second active set cooperatively define a second active set measurement;
   in response to receiving the first resource request and the second resource request, the RAN determining that the first WCD and second WCD are contending for a resource of a given sector defined by the RAN, wherein the first WCD receives signals from the given sector at a first signal strength and the second WCD receives signals from the given sector at a second signal strength;
   in response to determining that the first WCD and second WCD are contending for the resource, the RAN (i) comparing the first signal strength with the first active set measurement to produce a first result, (ii) comparing the second signal strength with the second active set measurement to produce a second result, and (iii) comparing the first result with the second result to produce a third result; and
   based on the third result, the RAN allocating the resource to the first WCD.

11. The method of claim 10, wherein the first result is a first difference between the first signal strength and the first active set measurement, wherein the second result is a second difference between the second signal strength and the second active set measurement, and wherein the third result is that the first difference is greater than the second difference.

12. The method of claim 10, wherein the first result is a first ratio between the first signal strength and the first active set measurement, wherein the second result is a second ratio between the second signal strength and the second active set measurement, and wherein the third result is that the first ratio is greater than the second ratio.

13. The method of claim 10, wherein the first active set measurement based on an operation chosen from a group consisting of a minimum, a maximum, a median, and a mean.

14. The method of claim 10, wherein the resource comprises a code division multiple access (CDMA) code.

15. The method of claim 10, wherein the resource is the only resource of a given type available in the given sector.

16. A radio access network (RAN) component capable of controlling a given sector, the RAN component comprising:
   a processor;
   a data storage; and
   program instructions, stored in the data storage and executable by the processor, to (i) receive a first resource request from a first wireless communication device (WCD), wherein the first WCD has a first active set of sectors, (ii) receive a second resource request from a second WCD, wherein the second WCD has a second active set of sectors, (iii) in response to receiving the first resource request and the second resource request, determine that the first WCD and second WCD are contending for a resource of the given sector, (iv) in response to determining that the first WCD and second WCD are contending for the resource, compare the first active set with the second active set, and (v) based on a result of the comparison of the first active set with the second active set, allocate the resource to the first WCD.

17. The RAN component of claim 16, wherein the program instructions to compare the first active set with the second active set comprise program instructions to compare a size of the first active set with a size of the second active set.

18. The RAN component of claim 17, wherein the result of the comparison is that the size of the first active set is smaller than the size of the second active set.

19. The RAN component of claim 16, wherein the first WCD receives signals from the given sector at a first signal strength, wherein the second WCD receives signals from the given sector at a second signal strength, wherein signals the first WCD receives from sectors in the first active set cooperatively define a first active set measurement, and wherein signals the second WCD receives from sectors in the second active set cooperatively define a second active set measurement, and wherein the program instructions to compare the first active set with the second active set comprise:
   program instructions to (i) determine that the first active set and the second active set are the same size, and (ii) in response to determining that the first active set and the second active set are the same size, (a) compare the first signal strength with the first active set measurement to produce a first result, (b) compare the second signal strength with the second active set measurement to produce a second result, and (c) compare the first result with the second result to produce the result of the comparison of the first active set with the second active set.

20. The RAN component of claim 19, wherein the first result is a first difference between the first signal strength and the first active set measurement, wherein the second result is a second difference between the second signal strength and the second active set measurement, and wherein the result of the comparison of the first active set with the second active set is that the first difference is greater than the second difference.

* * * * *